Patented Dec. 2, 1941

2,264,411

UNITED STATES PATENT OFFICE 2,264,411

CELLULOSE ESTERS

George W. Seymour and Blanche B. White, Cumberland, Md., assignors to Celanese Corporation of America, a corporation of Delaware No Drawing. Application April 6, 1939,
Serial No. 266,413

26 Claims. (Cl. 260—227)

This invention relates to the production of organic esters of cellulose.

An object of this invention is the production of esters of cellulose so that the same may be stored for a considerable period of time without any deleterious effects.

Another object of this invention is the production of organic esters of cellulose in the presence of agents which make it possible to reduce substantially the amount of catalyst required for the esterification.

Still another object of the present invention is the production of cellulose acetate in such a manner that the acetylation solution can be used for wet spinning into filaments and the like.

Other advantages will be apparent from the detailed description and the claims.

The manufacture of organic esters of cellulose, particularly the lower fatty acid esters of cellulose, is well known. The esterification of cellulose is usually effected by means of the anhydride of the acid corresponding to the radicle it is desired to introduce into the cellulose molecule, the esterification being generally carried out in the presence of the corresponding acid and an esterification catalyst such as sulphuric acid, zinc chloride, acid sulphates or mixtures of sulphuric and phosphoric acids. The fatty acid added not only affords the means to control the temperature and the rate of reaction but also acts as a solvent for the cellulose ester formed. In these processes extreme care must be exercised in regulating the amounts of the several ingredients and the conditions of the reaction to prevent a solidification or gelation of the esterification solution. This is true not only during the esterification reaction itself but also during and after the ripening period.

We have now found that this solidification or gelation of cellulose esterification solutions can be avoided in a simple and economic manner. We have found that the addition of certain agents to the esterification solution, either before or after the addition of the water for hydrolyzing the excess of acid anhydride present, will maintain the solution in its liquid state without promoting undesirable side reactions.

In accordance with our invention we add to the acetylation solution obtained by the treatment of cellulose with a mixture of acetic acid anhydride, acetic acid and sulphuric acid, an organic acid having a dissociation constant not lower than $1.55 \times 10^{-3}$. Acids which we have found to give excellent results are monochloracetic acid, trichloracetic acid and oxalic acid. The addition of such an acid to the acetylation solution has the effect of maintaining or stabilizing the solution so that it retains its liquid condition for an indefinite period of time without promoting any side reactions. While the acid may be added in various amounts, the best results were obtained when employing the same in amounts between 5 to 10%, on the weight of the acetylation solution. This beneficial effect is obtained whether the acid is added to the acetylation solution before or after the excess of acetic acid anhydride is hydrolyzed by the addition of water.

Our invention is of great commercial importance particularly in the manufacture of yarns, films or foils from cellulose acetate. As a result of our discovery it is now possible to form filaments, foils or films directly from the primary acetylation solution by wet spinning processes since it is possible to store this solution until ready for use in the wet spinning process. Thus the acetylation is carried out to the desired point, at which time enough water is added to hydrolyze the acetic anhydride present, and to this acetylation solution is added the desired amount of oxalic acid, monochloracetic acid or trichloracetic acid. Solutions thus treated have been stored for several months without any appreciable change in their viscosity and without any tendency toward gelation.

The present invention is also important from the standpoint of producing cellulose acetate, even though the primary cellulose acetate solution is not to be used for wet spinning. We have found that the addition of an organic acid such as monochloracetic acid, trichloracetic acid or oxalic acid to primary acetylation solutions, after acetylation has been carried out to the desired degree, has the effect of maintaining the solutions as such for weeks even though no water is added and the acetic anhydride is still present and acetylation can still continue slowly. This is an entirely unexpected result for a similar acetylation solution without the addition of one of the said acids will become solid in a day or two. This discovery is of especial value in connection with continuous processes for the acetylation of cellulose. The cellulose acetate may be obtained from primary cellulose acetate solution containing the added acid in the usual manner, that is by adding water to hydrolyze the anhydride and remove the sulphates and then adding more water to precipitate the cellulose acetate.

Another advantage arising from the present invention is in the amount of sulphuric acid catalyst necessary during the acetylation solution.

Heretofore in the manufacture of cellulose acetate it has been necessary to use comparatively large amounts, as much as 15 to 20%, of a catalyst such as sulphuric acid to avoid the gelation or solidification of the acetylation bath. This not only increased the cost of manufacture but also enhanced the possibility of undesirable and unstable sulpho compounds being formed, necessitating special stabilizing treatments for the cellulose acetate. We have discovered that when employing our invention it is possible to reduce, substantially, the amount of sulphuric acid used as catalyst. Thus the amount of sulphuric acid may be reduced to as low as 0.5% based on the weight of the cellulose, particularly in the preparation of cellulose acetate solutions to be used for wet spinning. As a result of our invention we have obtained a cellulose triacetate which is free of products which impair its stability.

In order further to illustrate our invention but without being limited thereto, the following specific examples of carrying out the invention are given:

*Example I*

100 parts of cellulose were treated with a mixture of 835 parts of glacial acetic acid, 275 parts of acetic acid anhydride and 0.5 part of sulphuric acid. Acetylation was completed after about 3½ hours, with a peak of 50–60° C., after which enough water, 24.6 to 37.4 parts, was added to hydrolyze the excess acetic acid anhydride, and oxalic acid, equal to approximately 10% on the weight of the acetylation solution, was then introduced into the solution.

After standing several months, it was found that the solution exhibited no tendency toward gelation or solidification and that there was no material change in the viscosity of the same. A similar acetylation solution without the added oxalic acid showed a tendency to gel in less than two days and became solid in three or four days. The solution even after being stored for such periods was still suitable for wet spinning into filaments, foils and the like. The products obtained were relatively free of combined sulphates and had an acetyl value of about 62.5%, calculated as acetic acid.

*Example II*

100 parts of cellulose were treated as in Example I but using monochloracetic acid instead of oxalic acid. The results were similar to those obtained in Example I.

*Example III*

100 parts of cellulose were treated as in Example I but using trichloracetic acid instead of oxalic acid. The results were similar to those obtained in Example I.

*Example IV*

100 parts of pretreated cellulose were treated with a pre-cooled mixture comprising 370 parts of glacial acetic acid, 205 parts of acetic acid anhydride and 14.5 parts of sulphuric acid. The acetylation was carried out for about 1½ hours, with a peak of 40–50° C., after which 5%, on the weight of the acetylation solution, of oxalic was added to the solution. The solution, after being stored at room temperature for over a week, showed some increase in viscosity but no gelation or solidification. A similar acetylation solution to which no oxalic acid had been added became solid in less than two days.

A charge similar to the above was prepared but to which 10% of oxalic acid was added instead of 5%. There was no measurable change in the viscosity of the solution even after being stored for over a week at room temperature nor was there any tendency toward gelation or solidification.

The cellulose acetate can be obtained from such solutions by precipitation in water in the usual manner. The cellulose acetate was found to have an acetyl value of 62.5%, calculated as acetic acid, and the cellulose acetate was found to be comparatively free of sulphates and of excellent stability. If desired the cellulose acetate can of course be ripened to obtain cellulose acetates of lower acetyl value.

*Example V*

100 parts of pretreated cellulose were treated as in Example IV but substituting the monochloracetic acid for the oxalic acid. Results similar to those obtained in Example IV were obtained.

*Example VI*

100 parts of pretreated cellulose were treated as in Example IV but substituting the trichloracetic acid for the oxalic acid. Results similar to those obtained in Example IV were obtained.

While this invention is of special importance in connection with the manufacture of cellulose acetate and has been described particularly in connection with its manufacture, it is also applicable to the manufacture of other organic esters of cellulose, simple or mixed, such as cellulose formate, cellulose propionate, cellulose butyrate, cellulose acetate propionate, cellulose acetate butyrate and the like. This invention is also applicable to the manufacture of cellulose acetates having an acetyl content other than 62.5%, for example, cellulose acetates having acetone solubility, that is with an acetyl content of about 51.0 to 56.5%.

It is to be understood that the foregoing detailed description is merely given by way of illustration and that many variations may be made therein without departing from the spirit of our invention.

Having described our invention, what we desire to secure by Letters Patent is:

1. In a process for the production of lower fatty acid esters of cellulose by a method wherein a lower fatty acid anhydride in solution in a lower fatty acid is employed in the esterification operation, the step of adding to the primary esterification solution an organic acid having a dissociation constant not lower than $1.55 \times 10^{-3}$ while avoiding the addition of sufficient hydrolyzing agent to bring about any substantial reduction in the acidyl value of the cellulose ester.

2. In a process for the production of cellulose acetate wherein acetic acid anhydride in solution in a lower fatty acid is employed in the acetylation process, the step of adding to the primary acetylation solution an organic acid having a dissociation constant not lower than $1.55 \times 10^{-3}$ while avoiding the addition of sufficient hydrolyzing agent to bring about any substantial reduction in the acetyl value of the cellulose acetate.

3. In a process for the production of cellulose acetate wherein acetic acid anhydride in solution in a lower fatty acid is employed in the acetylation process, the step of adding monochloracetic acid to the acetylation solution, while avoiding the addition of sufficient hydrolyzing agent to bring about any substantial reduction in the acetyl value of the cellulose acetate.

4. In a process for the production of cellulose acetate wherein acetic acid anhydride in solution in a lower fatty acid is employed in the acetylation process, the step of adding trichloracetic acid to the acetylation solution while avoiding the addition of sufficient hydrolyzing agent to bring about any substantial reduction in the acetyl value of the cellulose acetate.

5. In a process for the production of cellulose acetate wherein acetic acid anhydride in solution in a lower fatty acid is employed in the acetylation process, the step of adding oxalic acid to the acetylation solution while avoiding the addition of sufficient hydrolyzing agent to bring about any substantial reduction in the acetyl value of the cellulose acetate.

6. In a process for the production of cellulose acetate wherein acetic acid anhydride in solution in a lower fatty acid is employed in the acetylation process, the step of adding to the primary acetylation solution 5 to 10%, based on the weight of said acetylation solution, of monochloracetic acid, while avoiding the addition of sufficient hydrolyzing agent to bring about any substantial reduction in the acetyl value of the cellulose acetate.

7. In a process for the production of cellulose acetate wherein acetic acid anhydride in solution in a lower fatty acid is employed in the acetylation process, the step of adding to the primary acetylation solution 5 to 10%, based on the weight of said acetylation solution, of trichloracetic acid, while avoiding the addition of sufficient hydrolyzing agent to bring about any substantial reduction in the acetyl value of the cellulose acetate.

8. In a process for the production of cellulose acetate wherein acetic acid anhydride in solution in a lower fatty acid is employed in the acetylation process, the step of adding to the primary acetylation solution 5 to 10%, based on the weight of said acetylation solution, of oxalic acid, while avoiding the addition of sufficient hydrolyzing agent to bring about any substantial reduction in the acetyl value of the cellulose acetate.

9. Process for the production of lower fatty acid esters of cellulose of high acyl content, which comprises reacting cellulose with the anhydride of the acid of the ester desired with an acidic esterification catalyst, and adding to the primary esterification solution an organic acid having a dissociation constant not lower than $1.55 \times 10^{-3}$ while avoiding the addition of sufficient hydrolyzing agent to bring about any substantial reduction in the acidyl value of the cellulose ester.

10. Process for the production of cellulose acetate of high acetyl content, which comprises reacting cellulose with acetic acid anhydride with an acidic acetylation catalyst, and adding to the primary acetylation solution an organic acid having a dissociation constant not lower than $1.55 \times 10^{-3}$ while avoiding the addition of sufficient hydrolyzing agent to bring about any substantial reduction in the acetyl value of the cellulose acetate.

11. Process for the production of lower fatty acid esters of cellulose, which comprises reacting cellulose with the anhydride of the acid of the ester desired with an acidic esterification catalyst, adding sufficient water to neutralize the excess acid anhydride present but insufficient to bring about any substantial reduction in the acidyl value of the cellulose ester, and then adding to the primary esterification solution an organic acid having a dissociation constant not lower than $1.55 \times 10^{-3}$.

12. Process for the production of cellulose acetate which comprises reacting cellulose with acetic acid anhydride, with an acidic acetylation catalyst, adding sufficient water to neutralize the excess acid anhydride present but insufficient to bring about any substantial reduction in the acetyl value of the cellulose acetate, and then adding to the primary acetylation solution an organic acid having a dissociation constant not lower than $1.55 \times 10^{-3}$.

13. Process for the production of cellulose acetate, which comprises reacting cellulose with acetic acid anhydride in solution in acetic acid and sulphuric acid as catalyst, and adding to the primary acetylation solution 5 to 10%, based on the weight of the acetylation solution, of monochloracetic acid, while avoiding the addition of sufficient hydrolyzing agent to bring about any substantial reduction in the acetyl value of the cellulose acetate.

14. Process for the production of cellulose acetate, which comprises reacting cellulose with acetic acid anhydride in solution in acetic acid and 0.5%, based on the weight of the acetylation solution, of sulphuric acid, and adding to the primary acetylation solution 5 to 10%, based on the weight of the acetylation solution, of monochloracetic acid, while avoiding the addition of sufficient hydrolyzing agent to bring about any substantial reduction in the acetyl value of the cellulose acetate.

15. Process for the production of cellulose acetate, which comprises reacting cellulose with acetic acid anhydride in solution in acetic acid and 0.5%, based on the weight of the acetylation solution, of sulphuric acid, and adding to the primary acetylation solution 5 to 10%, based on the weight of the acetylation solution, of trichloracetic acid, while avoiding the addition of sufficient hydrolyzing agent to bring about any substantial reduction in the acetyl value of the cellulose acetate.

16. Process for the production of cellulose acetate, which comprises reacting cellulose with acetic acid anhydride in solution in acetic acid and 0.5%, based on the weight of the acetylation solution, of sulphuric acid, and adding to the primary acetylation solution 5 to 10%, based on the weight of the acetylation solution, of oxalic acid, while avoiding the addition of sufficient hydrolyzing agent to bring about any substantial reduction in the acetyl value of the cellulose acetate.

17. Process for the production of cellulose acetate, which comprises reacting cellulose with acetic acid anhydride in solution in acetic acid and sulphuric acid as catalyst, adding sufficient water to neutralize the excess acid anhydride present but insufficient to bring about any substantial reduction in the acetyl value of the cellulose acetate, and then adding to the primary acetylation solution 5 to 10%, based on the weight of the acetylation solution, of monochloracetic acid.

18. Process for the production of cellulose acetate, which comprises reacting cellulose with acetic acid anhydride in solution in acetic acid and sulphuric acid as catalyst, adding sufficient water to neutralize the excess acid anhydride present but insufficient to bring about any substantial reduction in the acetyl value of the cellulose acetate, and then adding to the primary acetylation solution 5 to 10%, based on the weight of the acetylation solution, of trichloracetic acid.

19. Process for the production of cellulose acetate, which comprises reacting cellulose with acetic acid anhydride in solution in acetic acid and sulphuric acid as catalyst, adding sufficient water to neutralize the excess acid anhydride present but insufficient to bring about any substantial reduction in the acetyl value of the cellulose acetate, and then adding to the primary acetylation solution 5 to 10%, based on the weight of the acetylation solution, of oxalic acid.

20. Process for the stabilization of a cellulose esterification solution in order to render the same suitable for the wet spinning of artificial materials therefrom, which comprises adding to a primary esterification solution, obtained by reacting cellulose with a lower fatty acid anhydride with an acidic esterification catalyst, sufficient water to neutralize the excess acid anhydride present but insufficient to bring about any substantial reduction in the acidyl value of the cellulose ester, and then adding to said primary esterification solution 5 to 10%, based on the weight of the esterification solution, of monochloracetic acid.

21. Process for the stabilization of a cellulose esterification solution in order to render the same suitable for the wet spinning of artificial materials therefrom, which comprises adding to a primary esterification solution, obtained by reacting cellulose with a lower fatty acid anhydride with an acidic esterification catalyst, sufficient water to neutralize the excess acid anhydride present but insufficient to bring about any substantial reduction in the acidyl value of the cellulose ester, and then adding to said primary esterification solution 5 to 10%, based on the weight of the esterification solution, of trichloracetic acid.

22. Process for the stabilization of a cellulose esterification solution in order to render the same suitable for the wet spinning of artificial materials therefrom, which comprises adding to a primary esterification solution, obtained by reacting cellulose with a lower fatty acid anhydride with an acidic esterification catalyst, sufficient water to neutralize the excess acid anhydride present but insufficient to bring about any substantial reduction in the acidyl value of the cellulose ester, and then adding to said primary esterification solution 5 to 10%, based on the weight of the esterification solution, of oxalic acid.

23. Process for the stabilization of a cellulose acetylation solution in order to render the same suitable for the wet spinning of artificial materials therefrom, which comprises adding to a primary acetylation solution, obtained by reacting cellulose with acetic acid anhydride with sulphuric acid as catalyst, adding sufficient water to neutralize the excess acetic acid anhydride present but insufficient to bring about any substantial reduction in the acetyl value of the cellulose acetate, and then adding to said primary acetylation solution 5 to 10%, based on the weight of the acetylation solution, of monochloracetic acid.

24. Process for the stabilization of a cellulose acetylation solution in order to render the same suitable for the wet spinning of artificial materials therefrom, which comprises adding to a primary acetylation solution, obtained by reacting cellulose with acetic acid anhydride containing 0.5%, based on the weight of the acetylation solution, of sulphuric acid, adding sufficient water to neutralize the excess acetic acid anhydride present but insufficient to bring about any substantial reduction in the acetyl value of the cellulose acetate, and then adding to said primary acetylation solution 5 to 10%, based on the weight of the acetylation solution, of monochloracetic acid.

25. Process for the stabilization of a cellulose acetylation solution in order to render the same suitable for the wet spinning of artificial materials therefrom, which comprises adding to a primary acetylation solution, obtained by reacting cellulose with acetic acid anhydride containing 0.5%, based on the weight of the acetylation solution, of sulphuric acid, adding sufficient water to neutralize the excess acetic acid anhydride present but insufficient to bring about any substantial reduction in the acetyl value of the cellulose acetate, and then adding to said primary acetylation solution 5 to 10%, based on the weight of the acetylation solution, of monochloracetic acid.

26. Process for the stabilization of a cellulose acetylation solution in order to render the same suitable for the wet spinning of artificial materials therefrom, which comprises adding to a primary acetylation solution, obtained by reacting cellulose with acetic acid anhydride containing 0.5%, based on the weight of the acetylation solution, of sulphuric acid, adding sufficient water to neutralize the excess acetic acid anhydride present but insufficient to bring about any substantial reduction in the acetyl value of the cellulose acetate, and then adding to said primary acetylation solution 5 to 10%, based on the weight of the acetylation solution, of oxalic acid.

GEORGE W. SEYMOUR.
BLANCHE B. WHITE.